United States Patent
Chen

(12) 
(10) Patent No.: US 10,331,400 B1
(45) Date of Patent: Jun. 25, 2019

(54) METHODS AND APPARATUS FOR SOFT CLIPPING

(71) Applicant: Cirrus Logic International Semiconductor Ltd., Edinburgh (GB)

(72) Inventor: Henry Chen, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/902,180

(22) Filed: Feb. 22, 2018

(51) Int. Cl.
*H04B 15/00* (2006.01)
*G06F 3/16* (2006.01)

(52) U.S. Cl.
CPC .................................. *G06F 3/165* (2013.01)

(58) Field of Classification Search
CPC ................................. G06F 3/165; G10L 21/02
See application file for complete search history.

(56) References Cited

U.S. PATENT DOCUMENTS

| | | | | |
|---|---|---|---|---|
| 6,424,635 B1* | 7/2002 | Song | ...................... | H04B 3/23 370/286 |
| 7,944,994 B2* | 5/2011 | Matsuura | .............. | H03F 1/3241 375/295 |
| 8,352,052 B1* | 1/2013 | Green | ...................... | H03G 3/10 700/94 |
| 2009/0169022 A1* | 7/2009 | Kost | ...................... | H03F 1/523 381/56 |
| 2010/0030555 A1* | 2/2010 | Otani | ...................... | H04L 1/20 704/224 |
| 2010/0272309 A1* | 10/2010 | Buining | ................. | H04R 19/02 381/394 |
| 2011/0026739 A1* | 2/2011 | Thomsen | .............. | H03F 1/3211 381/120 |
| 2012/0114127 A1* | 5/2012 | Yamashita | ........... | H03G 3/3005 381/56 |
| 2013/0272543 A1* | 10/2013 | Tracey | ..................... | H03G 3/32 381/107 |
| 2016/0019898 A1* | 1/2016 | Schreiner | ............ | G10L 19/0017 704/500 |
| 2016/0029132 A1* | 1/2016 | Freed | ............... | H04B 10/50595 381/317 |
| 2017/0337931 A1* | 11/2017 | Kawashima | ........ | G10L 21/0388 |
| 2017/0358181 A1* | 12/2017 | Moussette | ......... | H04M 1/72569 |

* cited by examiner

*Primary Examiner* — Simon King
(74) *Attorney, Agent, or Firm* — Jackson Walker L.L.P.

(57) ABSTRACT

A method of processing an audio signal comprising a plurality of audio samples, the method comprising: receiving an audio sample of the plurality of audio samples; on determining that a peak amplitude of the audio sample falls outside a threshold range: suppressing the audio sample to within the threshold range by applying a strictly increasing non-linear function to the audio sample; and outputting the suppressed audio sample; and on determining that the peak amplitude of the audio sample falls within the threshold range or is equal to an upper or lower limit of the threshold range: outputting the received audio sample.

32 Claims, 3 Drawing Sheets

METHODS AND APPARATUS FOR SOFT CLIPPING

TECHNICAL FIELD

The present disclosure relates to methods and apparatus for processing audio signals.

BACKGROUND

In audio signal processing, clipping is a form of waveform distortion that occurs when the amplitude of an audio signal exceeds a threshold amplitude of the system processing that input signal. When this occurs, the part of the input signal above the threshold amplitude is limited or "hard-clipped" to the threshold amplitude, resulting in harmonic distortion in the output (clipped) signal.

To reduce distortion associated with hard-clipping, soft-clipping techniques have been developed in which the transition between the clipped and non-clipped parts of the input signal are smoothed. Typically a Sigmoid function or other similar non-linear polynomial is applied to the input signal. In doing so, signal artefacts are minimised and associated harmonic distortion is reduced.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to an aspect of the disclosure, there is provided a method of processing an audio signal comprising a plurality of audio samples, the method comprising: receiving an audio sample of the plurality of audio samples; on determining that a peak amplitude of the audio sample falls outside a threshold range: suppressing the audio sample to within the threshold range by applying a strictly increasing non-linear function to the audio sample; and outputting the suppressed audio sample; and on determining that the peak amplitude of the audio sample falls within the threshold range or is equal to an upper or lower limit of the threshold range: outputting the received audio sample.

The level of suppression of the audio sample may be proportional to the difference between the peak amplitude of the audio sample and the upper or lower limit of the threshold range.

The strictly increasing non-linear function may be smooth within the threshold range.

Suppression of the audio sample may comprise reducing the peak amplitude to within 0.95 times the threshold range.

Determining that a peak amplitude of the audio sample falls outside of the threshold range may comprise: determining a suppression factor $\alpha$ proportional to the peak amplitude of the audio sample, wherein the non-linear function is weighted by the suppression factor.

A delay may be provided between determining the suppression factor and supressing the audio sample.

On determining that a peak amplitude of the audio sample falls outside a threshold range, the suppression factor $\alpha$ may be defined by the equation:

$$\alpha = \frac{T - T*f(P)}{P - T*f(P)}$$

where:
P is the peak amplitude of the audio sample;
$f(P)$ is the non-linear function solved for the peak amplitude P; and
T is the upper limit of the threshold range.

On determining that the peak amplitude of the audio sample falls within the threshold range or is equal to an upper or lower limit of the threshold range, the suppression factor $\alpha$ may be equal to 1.

The relationship between the received audio sample in and the output suppressed audio sample or the output received audio signal out may be defined as:

$$\text{out} = \alpha \cdot \text{in} + f(\text{in}) \cdot (1-\alpha)$$

where:
out is the output suppressed audio signal or the output received audio signal;
in is the received audio signal; and
$f(\text{in})$ is the non-linear function.

The non-linear function $f(\text{in})$ may comprise a Sigmoid function.

The non-linear function $f(\text{in})$ may comprise a function defined by the equation:

$$f(in) = \text{erf}\left(\frac{\sqrt[2]{\pi}}{2} in\right)$$

where in is the received audio sample.

The non-linear function may be a polynomial function.

Since both the input signal and the output signal are available, the method may further comprise applying a Wiener filter or other noise cancelling function to the suppressed audio sample.

The method may further comprise iteratively repeating the method of any one of the preceding claims for the remainder of the plurality of audio samples in the audio signal.

According to another aspect of the disclosure, there is provided a computer program comprising instructions which, when executed by a computer cause the computer to carry out the method as described above.

According to another aspect of the disclosure, there is provided a computer-readable storage medium comprising instructions which, when executed by a computer, cause the computer to carry out the method as described above.

According to another aspect of the disclosure, there is provided an apparatus for processing an audio signal comprising a plurality of audio samples separated in the time domain, the apparatus comprising: an input for receiving an audio sample of the plurality of audio samples; and one or more processors configured to: on determining that a peak amplitude of the audio sample falls outside of a threshold range: suppress the audio sample to within the threshold range by applying a strictly increasing non-linear function to the audio sample; and output the suppressed audio sample; and on determining that the peak amplitude of the audio sample falls within the threshold range or is equal to an upper or lower limit of the threshold range: outputting the received audio sample.

In some embodiments, the level of suppression of the audio sample is proportional to the difference between the peak amplitude of the audio sample and an upper or lower bound of the threshold range.

The strictly increasing non-linear function may be smooth within the threshold range.

Suppression of the audio sample may comprise reducing the peak amplitude to a level within 0.95 times the threshold range.

Determining that a peak amplitude of the audio sample falls outside of the threshold range may comprise: determining a suppression factor α proportional to the peak amplitude of the audio sample, wherein the non-linear function is weighted by the suppression factor.

A delay may be provided between determining the suppression factor and suppressing the audio sample.

On determining that a peak amplitude of the audio sample falls outside a threshold range, the suppression factor α may be defined by the equation:

$$\alpha = \frac{T - T * f(P)}{P - T * f(P)}$$

where:
P is the peak amplitude of the audio sample;
$f(P)$ is the non-linear function solved for the peak amplitude P; and
T is the upper limit of the threshold range.

On determining that the peak amplitude of the audio sample falls within the threshold range or is equal to an upper or lower limit of the threshold range, the suppression factor α may be made equal to 1.

Suppressing the audio sample may comprise applying the following function to the audio signal:

$$out = \alpha \cdot in + f(in) \cdot (1 - \alpha)$$

where:
out is the suppressed audio signal;
in is the received audio signal; and
$f(in)$ is the non-linear function.

The non-linear function $f(in)$ may comprise a sigmoid function.

The non-linear function $f(in)$ may comprise a function defined by the equation:

$$f(in) = \text{erf}\left(\frac{\sqrt[2]{\pi}}{2} in\right)$$

where in is the received audio sample.

The non-linear function may be a polynomial function.

The one or more processors may be further configured to apply a Wiener filter to the suppressed audio sample.

The input may be configured to iteratively receive the remainder of the plurality of audio samples. The one or more processors may then be further configured to iteratively repeat the steps of determining, suppressing and outputting for each of the remainder of the plurality of audio samples received at the input.

According to another aspect of the disclosure, there is provided an electronic device comprising an apparatus as described above. The electronic device may be: a mobile phone, for example a smartphone; a media playback device, for example an audio player; or a mobile computing platform, for example a laptop or tablet computer.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DESCRIPTION OF EMBODIMENTS

A side effect of conventional Sigmoid-type soft-clipping is that an input signal is supressed regardless of whether its peak amplitude is below or above the threshold amplitude of the system processing that input signal. For example, when an input signal having a peak amplitude below the threshold amplitude is suppressed using a Sigmoid function, the maximum amplitude of the output signal is limited to 0.76 times the threshold. This results in an overall loss of power in the output signal.

The present disclosure relates to improved techniques for the soft-clipping of audio signals, such techniques both minimizing harmonic distortion and maximising output power in the clipped waveform. A dynamic soft-clipping approach is provided in which the level of suppression of each sample in an audio signal is determined based on the peak amplitude of the sample being processed. In contrast to traditional soft-clipping approaches which distort the input signal regardless of its peak amplitude, techniques described herein leave samples substantially unchanged if their peak amplitude is equal to or below a threshold amplitude. A non-linear soft-clipping function is then applied only to components of the input signal who's amplitude exceeds the threshold.

Figure 1:
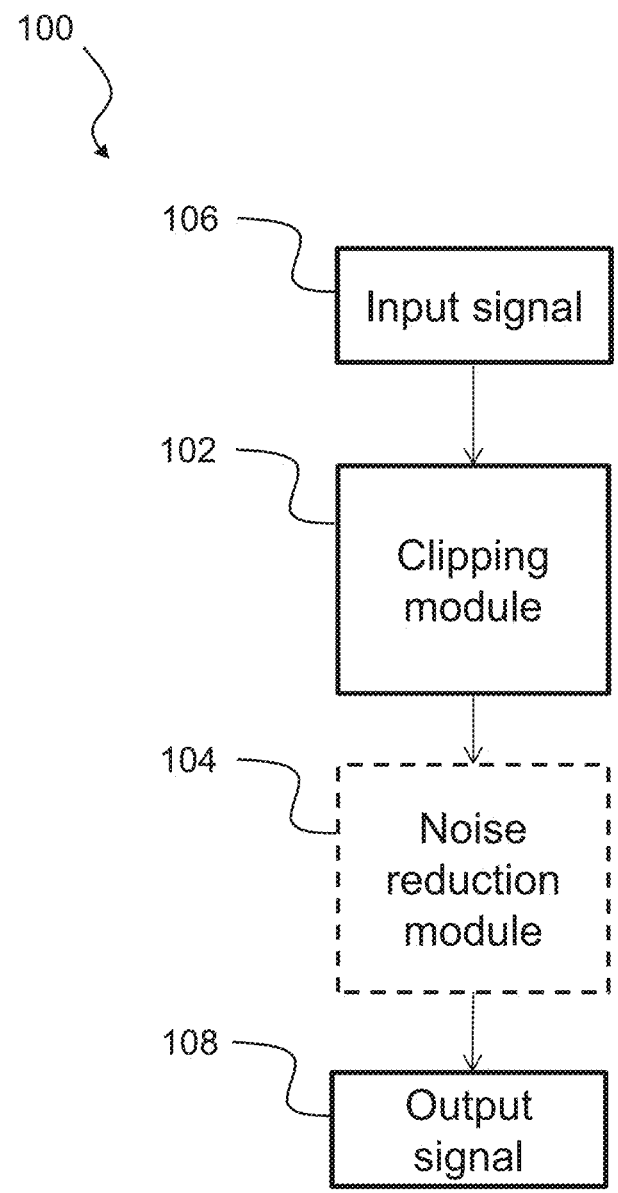
FIG. 1 is a schematic diagram of a system according to embodiments of the present disclosure.

FIG. 1 illustrates an example of how an audio signal may be processed according to embodiments of the present disclosure in terms of functional units or modules of a signal processing system 100.

It is noted that the term 'module' shall be used herein to refer to a functional unit or module which may be implemented at least partly by dedicated hardware components such as custom defined circuitry and/or at least partly be implemented by one or more software processors or appropriate code running on a suitable general purpose processor or the like. A module may itself comprise other modules or functional units.

The processing system 100 comprises a clipping module 102 and optionally a noise reduction module 104. The system 100 may additionally comprise other signal processing modules (not shown) for the purposes of amplifying, filtering and otherwise processing received audio signals using techniques known in the art.

The clipping module 102 is configured to receive an input signal 106 and to process the input signal 106 as will be described in more detail below. An output signal 108 is output from the clipping module 102, optionally via the noise reduction module 104. The noise reduction module 104, if provided, is configured to reduce noise introduced during the processing performed by the clipping module 102.

Figure 2:
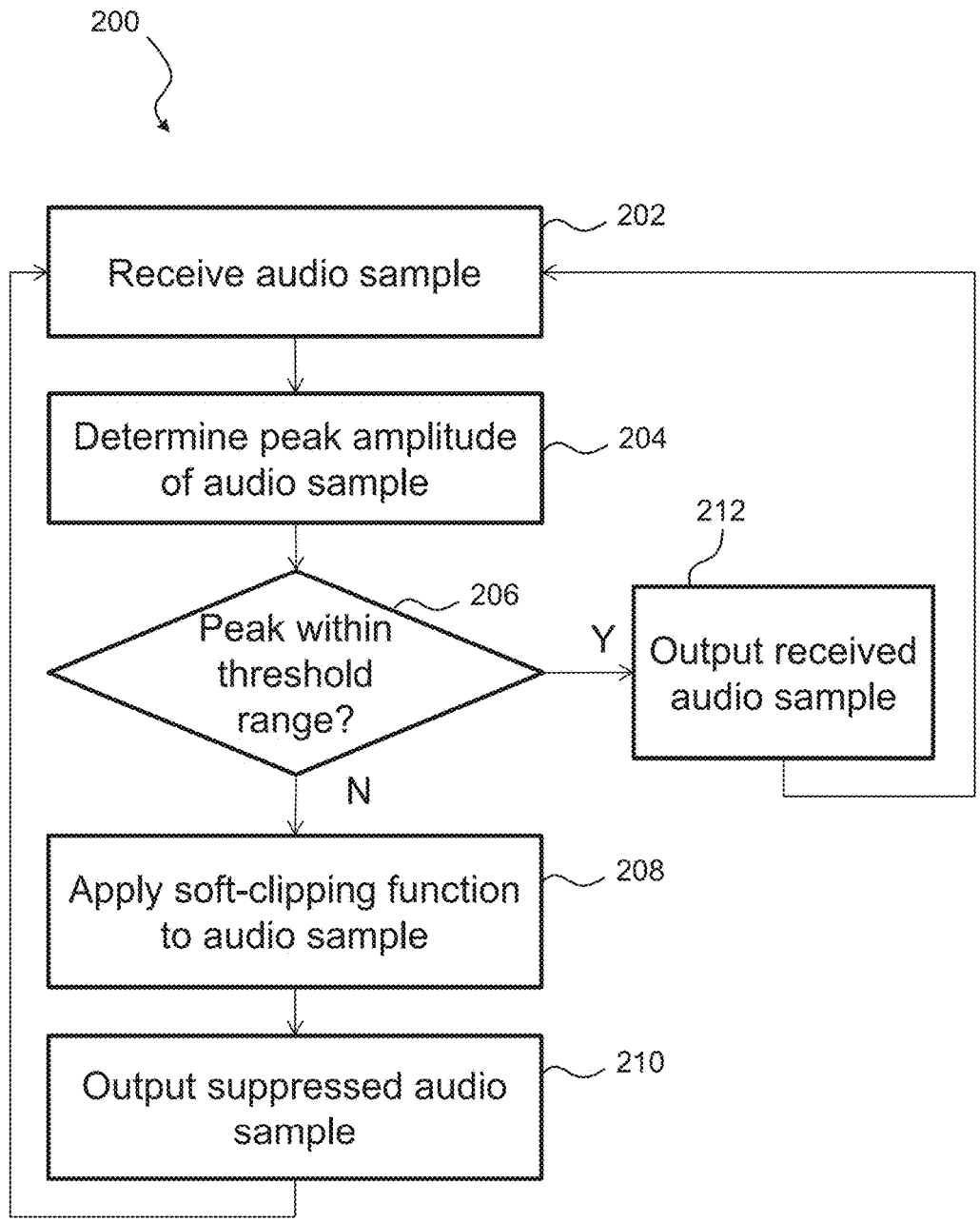
FIG. 2 is a flow diagram illustrating a method according to embodiments of the present disclosure.

FIG. 2 is a flow diagram illustrating an exemplary process 200 undertaken by the clipping module 102 for processing the input signal 106. At step 202 the clipping module 102 receives a sample of the input signal 106. The peak amplitude of the sample is then determined at step 204 and at step 206 the determined peak amplitude is compared with a threshold range, which may be a predetermined range or a range determined dynamically, as will be described in more detail below.

If the peak amplitude of the audio sample is found to fall outside of the threshold range, then the process 200 continues to step 208. At step 208, the audio sample is suppressed using a soft-clipping function and the suppressed audio sample may then be output at step 210. The process 200 then returns to step 202 where the next audio sample of the input signal 106 may be processed in a similar manner.

Returning to step 206, if the peak amplitude of the audio sample is found to fall within the threshold range or found to be equal to an upper or lower limit of the threshold range, then the process 200 continues to step 212, where the audio sample is output in its original, unsuppressed, form. The process 200 then returns to step 202 where the next audio sample of the input signal 106 may be processed in a similar manner.

It will be appreciated that, in contrast to prior art soft-clipping techniques which suppress audio samples irrespective of their amplitude, the clipping module 102 applies suppression only to audio samples who's peak amplitude falls outside of the defined threshold range. As such, overall, signal power is maximised whilst minimizing harmonic distortion associated with conventional hard clipping.

As mentioned above, the threshold range may be predetermined or determined dynamically during operation. In any case, the threshold range may be determined based on one or more characteristics of the signal processing system 100. For example, the threshold range may be determined in dependence on the operating limits of the system 100. In some embodiments, the threshold range may be chosen to be equal to a dynamic range of the system 100. In a digital system, the dynamic range or operating limits may be defined as ±1 or 0 dBFS.

The inventors have realised that any spectrum modifications made to the output signal 108 after processing by the clipping module 102 may change the crest factor of the signal which in turn may lead to an increase in the peak amplitude of the signal 108. In doing so, if the threshold amplitude is set to be substantially equal to the dynamic range of the system 100, then the peak amplitude of the output signal 108 after further spectral modification may fall outside of the threshold range which it was previously adjusted to fall within.

Accordingly, in order to reduce the risk that any post processing leads to the peak amplitude of the output signal 106 (after post-processing) falling outside of the operating limits of the system 100, the threshold range may be chosen to be a slightly smaller than the dynamic range (or operating limits) of the system 100. For example, the threshold range may be set at 0.5 dB inside of the full operating range of the system, i.e. ±0.95 or −0.5 dBFS. Providing a buffer either side of the threshold range to account for changes in crest factor associated with dynamic soft-clipping further acts to minimize the likelihood of hard clipping and associated harmonic distortion.

Suppressed signals falling outside of the threshold range may be processed using a conventional soft-clipping function. A soft-clipping function may be defined as a non-linear function which is strictly increasing. A function f(x) is said to be strictly increasing on an interval I if $f(b)>f(a)$ for all $b>a$, where a, b∈I. In order to minimize harmonic distortion introduced by applying the soft-clipping function to the audio sample, the soft-clipping function is preferably also smooth over the threshold range. In other words, the soft-clipping function preferably has continuous derivatives over its entire range of operation, e.g. the threshold range. In some embodiments, the soft-clipping function is a Sigmoid function. A Sigmoid function may be defined as a bounded differential real function that is defined for all real input values and has a positive derivative at each point.

The relationship between the received audio sample in and the output audio sample out may be defined by the following equation, $$out = \alpha \cdot in + f(in) \cdot (1-\alpha)$$

where $f(in)$ is the soft-clipping function used to suppress the output and a (alpha) is the suppression factor. For audio samples who's peak amplitude is found at step 206 to be within the threshold range, then the suppression factor alpha is set to 1. It follows that if the peak amplitude falls within the threshold range, then out=in and the audio sample is not suppressed. As mentioned above, this is in contrast with traditional soft-clipping approaches in which a soft-clipping function is applied to the audio sample regardless of whether the peak amplitude falls within or outside of the threshold range.

In some embodiments, for audio samples who's peak amplitude falls outside of the threshold range, the suppression factor may be defined by the following equation:

$$\alpha = \frac{T - T * f(P)}{P - T * f(P)}$$

where P is the peak amplitude of the audio sample, $f(P)$ is the soft-clipping function solved for the peak amplitude P, and T is the magnitude of the upper or lower limit of the threshold range. Thus, the further the peak amplitude, P, falls outside of the threshold range, the smaller the value of alpha, which in turn increases both suppression of the received audio sample in and the weighting of the soft-clipping function (see relationship above).

Where T is chosen to be equal to the dynamic or operating range of the system 100, then T=1 and the above equation may be rewritten as:

$$\alpha = \frac{1 - f(P)}{P - f(P)}$$

Where T is chosen to be, for example, 0.5 dB lower than the operating range of the system 100 so as to account for changes in crest factor due to processing of the output audio sample, then T=0.95 and the above equation may be rewritten as:

$$\alpha = \frac{0.95 - 0.95 * f(P)}{P - 0.95 * f(P)}$$

It will be appreciated that rapid changes in the value of alpha may lead to artefacts which may be audible in the output signal 108. To minimise such artefacts, in some embodiments, the rate of change of alpha may be limited to a predetermined threshold value. In particular, the rate of change of alpha may be limited when the level of the input signal 106 is high, since the greater the amplitude of the input signal 106, the greater the effect a change of alpha has on the output signal 108. Equally, when the input signal 106 amplitude is low, alpha may be changed rapidly since the value of alpha has little or no effect on the output signal 108 at such low amplitudes.

To give enough time for alpha to change between samples having regard for the above discussion concerning minimising audible artefacts in the output signal 108, the clipping module 102 may "look ahead" at samples in the received input signal 106 which have yet to be processed to determine a peak amplitude of those signals such that alpha can be determined in advance. For example, if the frequency of the input signal 106 is above 500 Hz, the clipping module 102 may look ahead at samples 1 ms in advance, thereby ensuring at least one zero-crossing of the input signal during that 1 ms time frame. The clipping module 102 may then quickly adjust alpha during or close to the zero-crossing of the input signal 106, thereby minimising the impact of changing alpha on the quality of the output signal 108.

It may be appreciated that dynamic soft-clipping approaches described herein may introduce harmonic distortion, Accordingly, referring back to FIG. 1, the system 100 may comprise the noise reduction module 104 configured to reduce or remove harmonic distortion introduced by the soft-clipping module 102. The noise reduction module 104 may apply a noise reduction algorithm to the sample to remove artefacts generated by the soft clipping. In some embodiments, the noise reduction algorithm comprises a Wiener filter.

Figure 3:
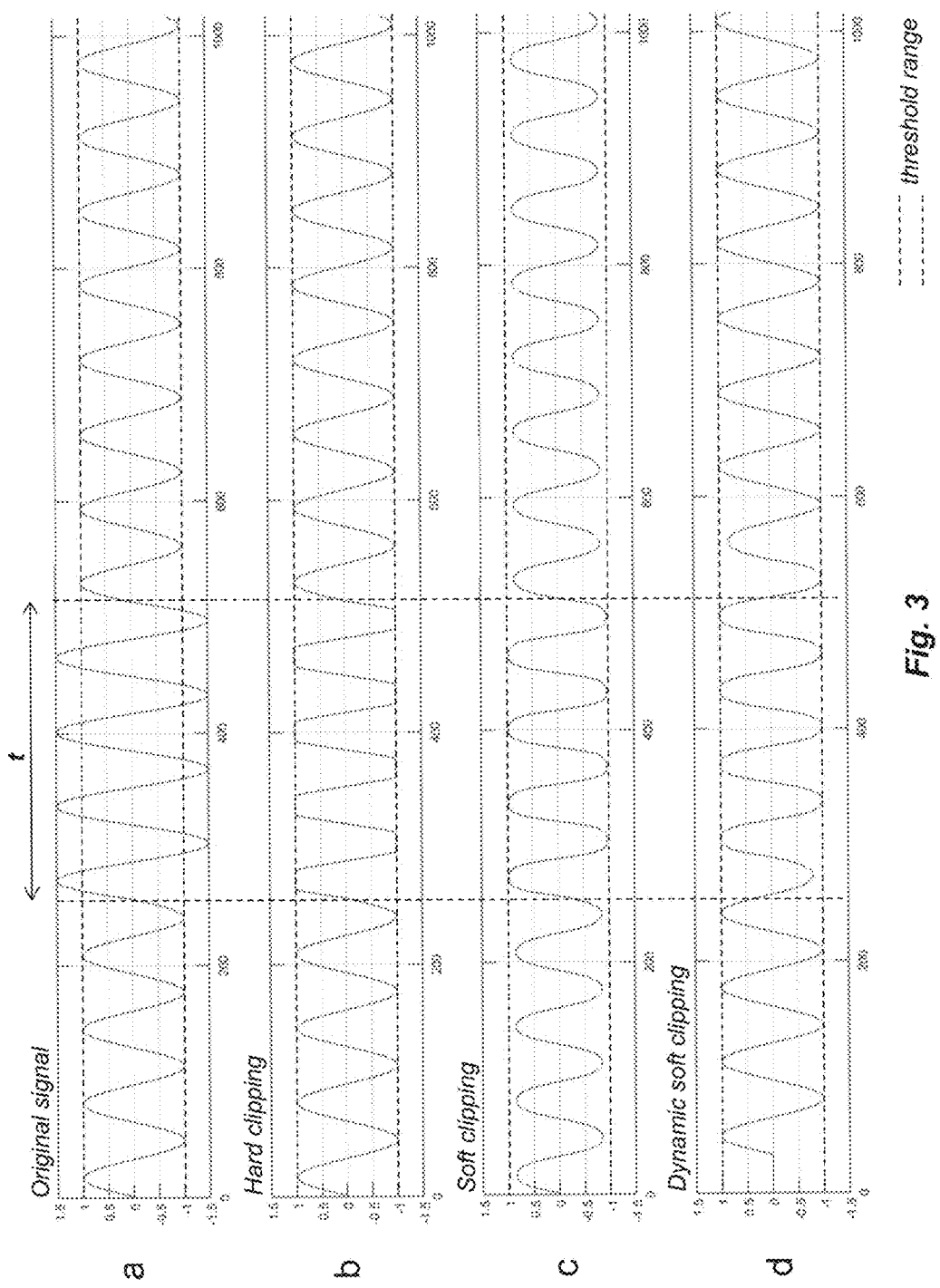
FIG. 3 is a graphical illustration comparing output waveforms resultant from conventional hard-clipping, conventional soft-clipping, and processing in accordance with embodiments of the present disclosure.

FIG. 3 graphically illustrates the output waveforms resultant from the processing of a sinusoidal input signal a) using b) conventional hard clipping; c) conventional soft-clipping using a Sigmoid function; and d) dynamic soft-clipping in accordance with embodiments of the present disclosure. In each plot, the threshold range is marked with horizontal dashed lines. Referring first to FIG. 3a, the sinusoidal input signal exceeds the threshold range for a time period t, either side of which the input signal is within the threshold range. FIG. 3b shows clipping of the signal to the upper and lower bounds of the threshold range. It can be seen that waveform is significantly distorted from the original input signal, the clipped signal resembling a square wave as opposed to the original sinusoid. FIG. 3c shows a conventionally soft-clipped signal. It can be seen that for the time period t, the soft-clipped waveform bares a similar resemblance to the original signal and falls within the threshold range. However, either side of the time period t, the amplitude of the soft-clipped signal is supressed relative to the original input signal. FIG. 3d shows an exemplary dynamically soft-clipped signal processed in accordance with embodiments of the present disclosure. It can be seen that, like the conventionally soft-clipped signal shown in FIG. 3c, during the time period t the waveform exhibits a similar resemblance to the original input waveform. However, in contrast to the conventionally soft-clipped signal, the waveform of the dynamically soft-clipped signal spans the entire threshold range either side of the period t, since no suppression is applied to the input signal during these time periods.

It is noted that in FIG. 3d, the lower peak of the waveform directly before time period t and the upper peak of the waveform directly after time period t appear suppressed. This is due to the samples/frames used to process the input signal spanning one peak falling within the threshold range and one peak falling outside of the threshold range.

It is also noted that in FIG. 3d a minor delay has been introduced by the dynamic soft-clipping approach, due to the clipping module 102 looking ahead to determine the threshold value in advance, so that it can be changed during or close to zero crossovers in the audio signal (as is explained in more detail above).

The system 100 or any modules thereof may be implemented in firmware and/or software. If implemented in firmware and/or software, the functions described above may be stored as one or more instructions or code on a computer-readable medium. Examples include non-transitory computer-readable media encode with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

It should be noted that the above-mentioned embodiments illustrate rather than limit the invention, and that those skilled in the art will be able to design many alternative embodiments without departing from the scope of the appended claims. The present embodiments are, therefore, to be considered in all respects as illustrative and not restrictive. The word "a" or "an" does not exclude a plurality, and a single feature or other unit may fulfil the functions of several units recited in the claims. Additionally the term "gain" does not exclude "attenuation" and vice-versa. Any reference numerals or labels in the claims shall not be construed so as to limit their scope.

The invention claimed is:

1. A method of processing an audio signal comprising a plurality of audio samples, the method comprising:
   receiving an audio sample of the plurality of audio samples;
   on determining that a peak amplitude of the audio sample falls outside a threshold range:
      suppressing the audio sample to within the threshold range by applying a strictly increasing non-linear function to the audio sample; and
      outputting the suppressed audio sample; and
   on determining that the peak amplitude of the audio sample falls within the threshold range or is equal to an upper or lower limit of the threshold range:
      outputting the received audio sample.

2. The method of claim 1, wherein a level of suppression of the audio sample is proportional to the difference between the peak amplitude of the audio sample and the upper or lower limit of the threshold range.

3. The method of claim 1, wherein the strictly increasing non-linear function is smooth within the threshold range.

4. The method of claim 1, wherein suppression of the audio sample comprises reducing the peak amplitude to within 0.95 times the threshold range.

5. The method of claim 1, wherein determining that a peak amplitude of the audio sample falls outside of the threshold range comprises:
   determining a suppression factor α proportional to the peak amplitude of the audio sample,
   wherein the non-linear function is weighted by the suppression factor.

6. The method of claim 5, wherein a delay is provided between determining the suppression factor and suppressing the audio sample.

7. The method of claim 5, wherein, on determining that a peak amplitude of the audio sample falls outside a threshold range, the suppression factor α is defined by the equation:

$$\alpha = \frac{T - T * f(P)}{P - T * f(P)}$$

where:
   P is the peak amplitude of the audio sample;
   f(P) is the non-linear function solved for the peak amplitude P; and
   T is the upper limit of the threshold range.

8. The method of claim 5, wherein, on determining that the peak amplitude of the audio sample falls within the threshold range or is equal to an upper or lower limit of the threshold range, the suppression factor α is equal to 1.

9. The method of claim 7, wherein the relationship between the received audio sample in and the output suppressed audio sample or the output received audio signal out is defined as:

out=α·in+ƒ(in)·(1−α)

where:
   out is the output suppressed audio signal or the output received audio signal;
   in is the received audio signal; and
   ƒ(in) is the non-linear function.

10. The method of claim 1, wherein the non-linear function ƒ(in) comprises a sigmoid function.

11. The method of claim 10, wherein the non-linear function ƒ(in) comprises a function defined by the equation:

$$f(in) = \text{erf}\left(\frac{\sqrt[2]{\pi}}{2} in\right)$$

where in is the received audio sample.

12. The method of claim 1, wherein the non-linear function is a polynomial function.

13. The method of claim 1, further comprising applying a Wiener filter to the suppressed audio sample.

14. The method of claim 1, further comprising iteratively repeating the method of any one of the preceding claims for the remainder of the plurality of audio samples in the audio signal.

15. A computer program comprising instructions which, when executed by a computer cause the computer to carry out the method of claim 1.

16. A computer-readable storage medium comprising instructions which, when executed by a computer, cause the computer to carry out the method of claim 1.

17. An apparatus for processing an audio signal comprising a plurality of audio samples separated in the time domain, the apparatus comprising:
   an input for receiving an audio sample of the plurality of audio samples; and
   one or more processors configured to:
      on determining that a peak amplitude of the audio sample falls outside of a threshold range:
         suppress the audio sample to within the threshold range by applying a strictly increasing non-linear function to the audio sample; and
         output the suppressed audio sample; and
      on determining that the peak amplitude of the audio sample falls within the threshold range or is equal to an upper or lower limit of the threshold range:
         outputting the received audio sample.

18. The apparatus of claim 17, wherein a level of suppression of the audio sample is proportional to the difference between the peak amplitude of the audio sample and an upper or lower bound of the threshold range.

19. The apparatus of claim 17, wherein the strictly increasing non-linear function is smooth within the threshold range.

20. The apparatus of claim 17, wherein suppression of the audio sample comprises reducing the peak amplitude to a level within 0.95 times the threshold range.

21. The apparatus of claim 17, wherein determining that a peak amplitude of the audio sample falls outside of the threshold range comprises:
   determining a suppression factor α proportional to the peak amplitude of the audio sample,
   wherein the non-linear function is weighted by the suppression factor.

22. The apparatus of claim 21, wherein a delay is provided between determining the suppression factor and suppressing the audio sample.

23. The apparatus of claim 21, wherein, on determining that a peak amplitude of the audio sample falls outside a threshold range, the suppression factor α is defined by the equation:

$$\alpha = \frac{T - T * f(P)}{P - T * f(P)}$$

where:
   P is the peak amplitude of the audio sample;
   f(P) is the non-linear function solved for the peak amplitude P; and
   T is the upper limit of the threshold range.

24. The apparatus of claim 21, wherein, on determining that the peak amplitude of the audio sample falls within the threshold range or is equal to an upper or lower limit of the threshold range, the suppression factor α is equal to 1.

25. The apparatus of claim 24, wherein suppressing the audio sample comprises applying the following function to the audio signal:

out=α·in+ƒ(in)·(1−α)

where:
   out is the suppressed audio signal;
   in is the received audio signal; and
   ƒ(in) is the non-linear function.

26. The apparatus of claim 17, wherein the non-linear function ƒ(in) comprises a sigmoid function.

27. The apparatus of claim 26, wherein the non-linear function ƒ(in) comprises a function defined by the equation:

$$f(in) = \text{erf}\left(\frac{\sqrt[2]{\pi}}{2} in\right)$$

where in is the received audio sample.

28. The apparatus of claim 25, wherein the non-linear function is a polynomial function.

29. The apparatus of claim 17, wherein the one or more processors is further configured to apply a Wiener filter to the suppressed audio sample.

30. The apparatus of claim 17, wherein the input is configured to iteratively receive the remainder of the plurality of audio samples and wherein the one or more processors is further configured to iteratively repeat the steps of determining, suppressing and outputting for each of the remainder of the plurality of audio samples received at the input.

31. An electronic device comprising an apparatus according to claim 17.

32. The electronic device of claim 31, wherein the electronic device is: a mobile phone, for example a smartphone; a media playback device, for example an audio player; or a mobile computing platform, for example a laptop or tablet computer.

\* \* \* \* \*

UNITED STATES PATENT AND TRADEMARK OFFICE
CERTIFICATE OF CORRECTION

PATENT NO. : 10,331,400 B1  
APPLICATION NO. : 15/902180  
DATED : June 25, 2019  
INVENTOR(S) : Henry Chen Page 1 of 1

It is certified that error appears in the above-identified patent and that said Letters Patent is hereby corrected as shown below:

In the Specification

1. In Column 6, Line 16, delete "a" and insert -- α --, therefor.

2. In Column 8, Line 10, delete "encode" and insert -- encoded --, therefor.

Signed and Sealed this  
Seventeenth Day of September, 2019

Andrei Iancu  
*Director of the United States Patent and Trademark Office*